United States Patent Office 3,162,659
Patented Dec. 22, 1964

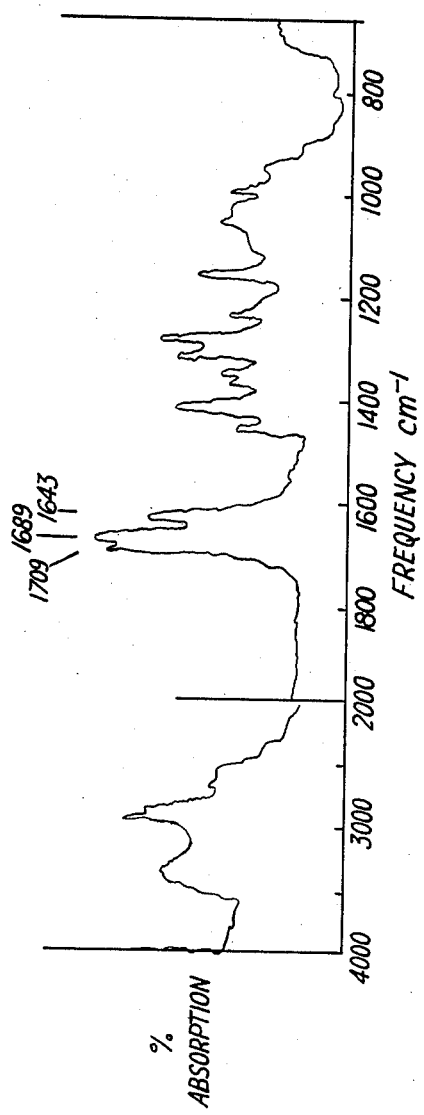

3,162,659
TRANS-9-OXODEC-2-ENOIC ACID
Robert Kenneth Callow, London, Colin Gasking Butler, Harpenden, and Norah Christine Johnston, London, England, assignors to National Research Development Corporation, London, England, a British corporation
Filed Nov. 25, 1960, Ser. No. 71,597
Claims priority, application Great Britain Nov. 27, 1959
1 Claim. (Cl. 260—413)

The present invention relates to the queen substance of the honeybee (Apis mellifera and A. indica) and active analogues thereof. The queen substance is produced by queen honeybees, and has the effect in the colony of inhibiting the development of ovaries in workers and of inhibiting the rearing of queens by the workers.

Objects of the present invention are to provide products exhibiting queen substance activity in an advantageous manner, to provide methods by which queen substance and its active analogues may readily be obtained, and to provide methods by which they may be employed to control the social behaviour of the bees in a manner favourable to the economics of honey production.

Although activity attributable to the existence of a queen substance was observed before the present invention in alcoholic extracts of queen bees, attempts to isolate a definite active single substance (which it was considered would be a steroid, a wax or a paraffin) in a pure state had been unsuccessful because, as can now be seen, of difficulties produced by the royal jelly acid (10-hydroxy-dec-2-enoic acid) contained in the crude material.

The present invention is in part based upon the discovery that the activity can be concentrated by subjecting crude material, containing it, to a solvent fractionation process wherein an aqueous solution containing water soluble impurities is rejected at one state (conveniently by partitioning the crude material between ether and water) and impurities soluble in petroleum are rejected at another stage. Subsequently the remaining active material may be extracted into alkali, recovered at pH 8.5 to 9.0 and further purified to yield anhydrous waxy crystals of substantial purity melting at 45 to 50° C. which are recrystallisable from aqueous methanol. Working details are given by the inventors in Nature, 184, 1871, December 5, 1959. In this form the material has an infra-red spectrum dispersed in solid potassium chloride, as shown in the accompanying drawing but without the broad peak at 3400 cm.$^{-1}$ which is an artefact attributable to the accidental presence of water in the potassium chloride when the spectrogram was prepared.

Never before has queen substance been obtained in such recrystallisable form. It should be noted that our reference to recrystallisability from aqueous methanol is given for purposes of identification. For purification by recrystallisation, a mixture of diethyl ether and hexane is the preferred solvent medium.

In accordance with one aspect of the present invention the recrystallisable substance has been found to be trans-9-oxo-dec-2-enoic acid and following the discovery of a synthetic route thereto this substance is provided in synthetic form as also are salts and other active functional derivatives especially alkyl esters, for example with alcohols containing from 1 to 4 carbon atoms. The highest melting point found for the pure acid so prepared is 52°–53° C.

The substance and its active derivatives may, it is found, be employed to improve the economics of honey production and, in accordance with a further aspect of the invention, there is provided a process of producing honey by maintaining a colony of bees in a hive and removing honey therefrom, characterized by the improvement which comprises the step of controlling the behaviour of the bees to reduce activities detrimental to the production of honey by introducing trans-9-oxo-dec-2-enoic acid or a salt, ester or other active functional derivative of said acid, e.g., its amide and substituted amides.

As the recrystallisable substance or active derivative is active in extremely small amounts it should be used with a diluent or a carrier.

In accordance with a feature of the invention there is provided a product for controlling the behaviour of honeybees in the hive which comprises a coherent carrier, acceptable to the bees, coated with or containing trans-9-oxo-dec-2-enoic acid, recrystallisable from aqueous methanol as crystals of substantial purity, or a salt, ester, or other active functional derivative of said acid.

From the coherent carrier the bees can take the active material, as from a queen, by licking. Diluents such as liquids or pulverulent solids are of little value as alternatives to coherent carriers for general use.

The product has two principal uses, i.e., the reduction of the swarming tendency and favouring the acceptance of a newly introduced queen.

A new queen is usually introduced into the hive in a queen cage, and for use in favouring her acceptance by the colony, the product takes the form of a coherent solid material through which the bees must penetrate in order to reach her. For this purpose a carrier in the form of paper or sugar candy which may be secured across, or plugged into, the entance of the cage gives the product a suitable form.

The use of the active material to reduce the swarming tendency, involves supplying it to the colony over a prolonged period, e.g., up to three months, and to this end the carrier should be of such form as to provide a slow release thereof. Convenient products are a solid, for example, low molecular weight polyethylene, impregnated with the active material and allowing its slow migration to the surface, or a product in which the carrier is a wick provided with a reservoir containing the active material in solution. A dead queen, wood, or other material normally found in the hive, soaked in a solution of the active material, may be employed.

In large apiaries the traditional practice of examining the hives at about 10-day intervals for signs of potential swarming accounts for a high proportion of the labour costs and control by the use of a product as provided by the present invention is extremely attractive especially where the release of active material is such that swarm control is achieved by a single visit at the beginning of the season. It is believed that the total annual cost of applying the present invention will be a trivial percentage of the value of the colonies and to illustrate the significance of the invention it may be stated that it would enable a saving to be achieved even if it were to cause a total loss of 15% of the colonies treated.

In a method of preparing a 1-alkyl trans-9-oxo-dec-2-enoate, i.e. an alkyl ester of the acid by synthesis, provided in accordance with the invention, a 1-monoalkyl trans-non-2-enedioate acid halide of the general formula $$XOC.(CH_2)_5CH:CH.COOR$$ 

in which X represents a halogen atom, preferably chlorine, and R represents an alkyl group, is reacted with a dialkyl cadmium or other metal alkyl to yield a complex which is decomposed with water. The acid itself may be obtained from the ester by acid hydrolysis. Attempts to obtain the acid by hydrolysis with alkali hydroxides have been unsuccessful.

As the hydrolysis of the ester presents difficulties, it is preferred to employ the ester itself as the final active material.

In a preferred form of the method the 1-monoalkyl trans-non-2-enedioate acid halide is prepared from a 1-alkyl hydrogen trans-non-2-enedioate (by reaction with thionyl chloride or other acid halide-forming agent, e.g. phosphorus trichloride) which may, in accordance with the invention, be produced from a monoalkyl azelate acid halide by selective halogenation, preferably selective bromination to yield a 9-alkyl 2-haloazelate-1-acid halide which is then subjected to the steps of esterification, dehydrohalogenation (for which purpose 2,4,6 collidine is a convenient base) and partial hydrolysis. Conveniently the monoalkyl azelate acid halide is monomethyl or monoethyl azelate acid chloride. The former is a known substance which may be prepared from azelaic acid, $$HO_2C(CH_2)_7CO_2H$$

via the monomethyl ester thereof.

Given in order, the intermediates involved in the synthesis of trans-9-oxo-dec-2-enoic acid from azelaic acid are:

(1) $R^1O_2C.(CH_2)_7.CO_2H$ _____ Alkyl hydrogen azelate.
(2) $R^1O_2C.(CH_2)_7.COX^1$ _____ Monoalkyl azelate acid halide.
(3) $R^1O_2C.(CH_2)_6.CHX^2.COX^1$ _____ 9-alkyl 2-haloazelate 1-acid halide.
(4) $R^1O_2C.(CH_2)_6.CHX^2.CO_2R$ _____ 9-alkyl 1-alkyl 2-haloazelate.
(5) $R^1O_2C.(CH_2)_5.CH:CH.CO_2R$ ___ 9-alkyl 1-alkyl trans - non-2-enedioate.
(6) $HO_2C.(CH_2)_5.CH:CH.CO_2R$ ____ 1 - alkyl hydrogen trans-non-2-enedioate.
(7) $X^3OC.(CH_2)_5.CH:CH.CO_2R$ ____ 1 - monoalkyl trans-non - 2-enedioate 9-acid halide.
(8) $CH_3.CO.(CH_2)_5.CH:CH.CO_2R$ __ 1-alkyl trans-9-oxodec-2-enoate.

In the formulae, $R^1$ represents an alkyl group preferably a methyl or ethyl group, R represents an alkyl group containing from 1 to 4 carbon atoms, e.g., a methyl or isopropyl group, $X^1$ and $X^3$ represent halogen atoms preferably chlorine atoms and $X^2$ represents a halogen atom, preferably a bromine atom.

Intermediates 1 to 4 are preferably not isolated in carrying out the synthesis.

In the partial hydrolysis of intermediate 5 by the action of alkalis, hydrolysis takes place most readily at the saturated end of the chain. Thus if the partial hydrolysis is carried out using a limited amount of alkali, preferably about 1 mol, the product is a mixture of unhydrolysed ester, hydrolysed ester and free dicarboxylic acid. In the fraction of half hydrolysed ester the desired ester with the ethylenic linkage in the $\alpha\beta$-position to the unhydrolysed carbalkoxy-group predominates.

The following example, in which all temperatures are expressed in degrees centigrade, is given by way of illustration:

EXAMPLE

Preparation of Dialkylbromoazelates From Alkyl Hydrogen Azelates

Methyl hydrogen azelate (90.3 g.) was mixed with 140 ml. of thionyl chloride and the mixture heated under reflux on a water-bath for 2 hours. At the end of this time the formation of the acid chloride was complete, and bromination was carried out by addition of 1.05 mols of bromine (78.5 g.) over a period of 4 hours to the gently boiling solution. After allowing to cool and stand overnight the mixture was poured into an excess (300 ml.) of methanol. A vigorous reaction took place, with evolution of sulphur dioxide and hydrogen chloride. After 2 hours, during which the mixture was shaken at intervals, the product was poured into water, the organic layer, which is denser than water, was separated, and the aqueous layer was extracted with ether twice, the ether extracts being added to the organic layer first separated. The ethereal mixture was dried over sodium sulphate, the ether removed by evaporation, and the residue distilled under reduced pressure. Dimethyl bromoazelate is a liquid distilling at 105–112° 0.1 mm. or 134–140° 1.5 mm. Yield, 72 g. Analysis: Found, C, 44.6; H, 6.26; Br, 26.5 percent. $C_{22}H_{19}O_4Br$ requires C, 44.8; H, 6.51 =Br, 27.1 percent.

By a similar method, but pouring the brominated acid chloride into isopropyl alcohol, there has been obtained methyl isopropyl bromoazelate.

$$CH_3O_2C.(CH_2)_6.CHBr.CO_2C_3H_7$$

B.P. 140–148°/1.8 mm. (Found, C, 48.6; H, 7.2; Br, 24.7 percent. $C_{13}H_{23}O_4Br$ requires C, 48.3; H, 7.1; Br, 24.7 percent.)

Further, starting with ethyl hydrogen azelate, there has been obtained ethyl isopropyl bromoazelate, $$C_2H_5O_2C.(CH_2)_6.CHBr.CO_2C_3H_7$$

B.P. 151–152°/1.8 mm., $n_D^{22}$ 1.4558. (Found, C, 49.9; H, 7.43; Br, 25.3 percent. $C_{14}H_{25}O_4Br$ requires C, 49.9; H, 7.48=Br, 23.7 percent.)

These three dialkyl bromoazelates are all useful intermediates in the synthesis of 9-oxodec-2-enoic acid.

Dialkyl Esters of Trans-Non-2-Enedioic Acid

Dimethyl bromoazelate (72 g.) was mixed with 2 volumes of 2,4,6-collidine and the mixture was boiled gently under reflux for 1 hour. The product, after cooling, was poured into water. The heavy oil was separated and the aqueous layer extracted twice with ether. The ether extracts were added to the oil and the mixture treated with dilute hydrochloric acid until the reaction to test paper was acid. The organic layer was then dried over sodium sulphate and, after removal of the ether, was distilled under reduced pressure. The product distilled in one main fraction, B.P. 117–126°/0.3 mm. yield 13.5 g. (Found, C, 60.4; H, 8.3 percent. $C_{11}H_{18}O_4$ requires C, 61.6=H, 8.5 percent.) The infrared absorption spectrum of the liquid dimethyl trans-non-2-enedioate shows a peak at 1647 cm.$^{-1}$ characteristic of an ethylenic linkage.

Other esters, also potentially useful as intermediates in the preparation of 9-oxodec-2-enoic acid, may be prepared by analogous methods. Methyl isopropyl trans-non-2-enedioate with the ethylenic linkage in the $\alpha\beta$-position to the carbo-propoxy-group, has B.P. 114–120°/0.3 mm. Ethyl isopropyl trans-non-2-enedioate has B.P. 132–136°/15 mm. (Found C, 63.9; H, 9.1 percent. $C_{14}H_{24}O_4$ requires C, 65.6; H, 9.5 percent.)

Mono-Alkyl Esters of Trans-Non-2-Enedioic Acid

Dimethyl trans-non-2-enedioate (13.5 g.) was treated at 20° with a mixture of 35 ml. of 10 percent by weight aqueous potassium hydroxide solution and 70 ml. of methanol. After standing overnight the mixture was diluted with water and unchanged ester extracted with ether. The aqueous solution was then acidified with hydrochloric acid and again extracted with ether several times. The combined ethereal extracts were dried over sodium sulphate, the ether removed and the residue distilled under reduced pressure. After a small amount of low-boiling material had passed over, the desired half ester came over at 152–153°/0.3 mm. Yield 4.7 g. The isopropyl ester, B.P. 142–148°/1.5 mm. or 130–132°/0.8 mm. was prepared similarily from the methyl isopropyl and ethyl isopropyl diesters.

Monoalkyl Trans-Non-2-Enedioate Acid Chloride

The monomethyl trans-non-2-enedioate obtained as described (5.6 g.) was mixed with 12 ml. of thionyl chloride and a piece of porous pot added to assist the evolution of gas. After keeping overnight at room temperature the reaction mixture was heated for half an hour on the steam bath, the excess of thionyl chloride was removed at the water-pump, and the residue was distilled under reduced pressure. The acid chloride distilled at 114–116°/0.6 mm. Yield 5.1 g.

The analogous isopropyl ester has also been prepared, in a less pure condition, boiling over the range 124–132°/1.3 mm.

Methyl Trans-9-Oxodec-2-Enoate

A Grignard reagent was prepared from 1.23 g. magnesium and an excess of methyl bromide in ether. To this was added 4.4 g. of cadmium chloride while the reaction-vessel was immersed in ice-water. After refluxing until reaction was complete, the ether was distilled off, benzene was added, and then partly distilled off, and finally 5.12 g. of monomethyl trans-non-2-enedioate acid chloride. A vigorous reaction took place, and after heating on the steam-bath for 10 minutes the mixture was cooled, decomposed with ice and dilute sulphuric acid, and the product extracted with benzene. The benzene extracts were washed with water, 5 percent sodium carbonate solution, again with water and finally dried, the benzene removed, and the residue distilled under reduced pressure. There was obtained 2.22 g. of methyl trans-9-oxo-dec-2-enoate, B.P. 116–120°/1.5 mm.

Isopropyl trans-9-oxodec-2-enoate, B.P. 120–130°/1 mm. was obtained by a similar reaction. Both of the esters were found to possess biological activity in the test for queen substance (inhibition of building of queen cells).

Trans-9-Oxodec-2-Enoic Acid

This acid was obtained from the isopropyl ester as follows. The ester (0.25 g.) was dissolved in acetone (4 ml.) and concentrated hydrochloric acid (1 ml.) was added. The mixture was kept at room temperature for five days. It was then diluted with water and extracted with ether. The ether solution was extracted with aqueous 5 percent sodium carbonate solution. The alkaline solution was acidified with hydrochloric acid and the trans-9-oxodec-2-enoic acid which separated as an oily product was extracted with ether. The ethereal solution was dried and evaporated. The residue 0.1 g. deposited crystals when kept at 2° C. These crystals separated from the adherent oil, melted at 45–52° and showed the characteristic infra-red absorption of queen substance obtained from queen bees. It also had the same rate of travel on a paper chromatogram as the natural material and, within the limits of error of the bioassay, had quantitatively the same biological activity in inhibiting construction of queen cells.

The bioassay procedure involved providing groups of bees with dead queens which had been freed from queen substance by extraction and then impregnated by dipping into an alcoholic solution of the material to be tested. Tested in this way the natural material and the synthetic acid both inhibited queen cell production when provided in an amount of about 0.13 $\mu$g. per bee.

It is to be understood that manufactured foodstuffs, e.g., fruit preserves, cakes and mead, prepared from honey produced with the aid of the products and active materials hereinbefore described are to be taken as falling within the ambit of the present invention.

We claim:

As a product of manufacture, the compound trans-9-oxodec-2-enoic acid.

References Cited in the file of this patent
UNITED STATES PATENTS

| | | |
|---|---|---|
| 2,446,849 | Price et al. | Aug. 10, 1948 |
| 2,734,482 | Seltzer | Feb. 14, 1956 |
| 2,824,546 | Klette | Feb. 25, 1958 |
| 2,848,467 | Nichols | Aug. 19, 1958 |
| 2,877,247 | Nichols | Mar. 10, 1959 |
| 2,894,964 | Nichols | July 14, 1959 |

OTHER REFERENCES

Ralston, Fatty Acids and Their Derivatives, pub. by John Wiley & Sons, Inc., New York, pp. 197–212, 1948.

Nature, vol. 184, page 1871, December 5, 1959.